United States Patent [19]

Launchbury et al.

[11] Patent Number: 5,238,635
[45] Date of Patent: Aug. 24, 1993

[54] PROCESS FOR TREATMENT OF PARTICULATE OLEFIN POLYMER, RESULTING TREATED PARTICLES AND METHOD FOR USING TREATING PARTICLES

[75] Inventors: Bryan J. Launchbury, Brussels, United Kingdom; Alain Lerou, Ste-Julie, Canada

[73] Assignee: Himont Incorporated, Wilmington, Del.

[21] Appl. No.: 869,652

[22] Filed: Apr. 16, 1992

[51] Int. Cl.$^5$ .................. B29C 45/00; B29C 47/00; B05D 1/00; B32B 1/00
[52] U.S. Cl. .................. 264/211; 264/328.17; 427/222; 428/407
[58] Field of Search .................. 264/109, 176.1, 211, 264/328.17; 427/222; 428/403, 407

[56] References Cited

U.S. PATENT DOCUMENTS

| | | | |
|---|---|---|---|
| 4,517,246 | 5/1985 | Matsuyama et al. | 428/407 |
| 5,006,368 | 4/1991 | Louks | 427/189 |
| 5,141,772 | 8/1992 | Chatterjec | 427/213 |
| 5,149,484 | 9/1992 | Ealer | 264/328.17 |

*Primary Examiner*—Mary Lynn Theisen

[57] ABSTRACT

Disclosed is a process for treating olefin polymer particles with phosphite- and phosphonite-free compositions consisting essentially of:

A. a polyhydric alcohol ester of a hindered phenol derivative of propionic acid having a melting point or melting range below about 130° C., B. about 20 to 35 parts based on 100 parts by weight of component A of a mono-ester of a hindered phenol derivative of propionic acid having a melting point or melting range below about 130° C., C. about 20–75 pph of a viscosity-reducing agent having a viscosity of about 180 to 55,000 Saybolt Universal Seconds at 100° F. (38° C.), D. up to 1000 pph each of an antistatic agent, a slip agent or mixture thereof and E. up to 1000 pph each of a light stabilizer, a thioether, an organic polysulfide, an acid scavenger or neutralizer, a nucleating agent, or a mixture thereof. The resulting surface-treated polymer particles and end uses therefor are also disclosed.

13 Claims, No Drawings

PROCESS FOR TREATMENT OF PARTICULATE OLEFIN POLYMER, RESULTING TREATED PARTICLES AND METHOD FOR USING TREATING PARTICLES

This invention relates to a method for treating the surfaces of particulate olefin polymer particles so as to stabilize the polymers against detrimental effects of environmental conditions (particularly oxidative degradation). An aspect of this invention relates to the surface treatment of olefin polymers in nonextruded particle form wherein the particles have a regular, essentially symmetrical, usually substantially spheroidal geometrical shape. Still another aspect of this invention relates to the resulting treated polymer particles. A further aspect of this invention relates to treated polymer particles useful in injection molding and extrusion processes where melt stability is not necessary.

DESCRIPTION OF THE PRIOR ART

In recent years, it has been discovered that certain olefin polymerization processes utilizing a Ziegler-Natta catalyst inherently produce particulate olefin polymers in which the polymer particles have a strong tendency to be regular in geometrical shape and fairly narrowly distributed in particle size range (e.g. where the majority of the particles are 0.5 to 4.5 mm in their longest dimension). The size and shape (and relatively good consistency of size and shape) of these particles is advantageous, as is their high flowability, high bulk density, and absence of fines, hence masses of these particles lend themselves to a wide variety of uses, including the formation of polymeric articles that come into contact with substances (such as food, drugs, etc.) that are subject to human or animal consumption or ingestion. These polymeric articles must meet high standards of safety and purity, e.g. low or negligible toxicity.

Although the inherently well-controlled size and shape of these polymeric particulate masses may be ideal for certain uses, the particles themselves are not necessarily suited for storage, handling, processing and end-use unless they are modified in terms of stability, a major stability problem being the tendency of the particles to be oxidatively degraded. The particles can be blended with antioxidants, light stabilizers, slip agents, antistatic agents, etc. in a mixer and then re-pelletized, but this approach to stabilization fails to capitalize on the inherent advantages of the particulate olefin polymers discharged from the polymerization reactor. Another approach involves treating the particles in a solvent or suspending medium, but this approach involves inconvenient or complicated solvent-removal steps, and the resulting coating may not survive prolonged periods of storage or handling.

A highly effective, relatively simple, and convenient process for surface treatment (stabilization) of these polymer particles is disclosed in European laid-open application 0,411,628 (Caselli et al), laid-open on Feb. 6, 1991. The process of EP '628 takes advantage of the fact that certain antioxidants, melt-stabilizers, and other treatment or additive agents are liquid (e.g. molten) in the temperature range at which the freshly-polymerized polymer particles emerge from the polymerization reactor. Accordingly, the additive composition is in a liquid state when it is applied to the polymer particles, and it tends to form an adherent coating on the surfaces of the polymer particles. Moreover, the additive composition can be formulated so that it will utilize only those ingredients which are generally recognized as safe (under pure food and drug laws), whereby the treated or coated polymer particles can be used to make a wide variety of shaped polymeric articles, including polymeric articles which come into contact with food, drugs, etc.

The additive compositions of EP '628 are sufficiently tacky at the temperature of application so as to form a highly adherent coatings on the surfaces of the polymer particles. This adherent effect is provided by the melt-stabilizer component of the additive composition, i.e. the organic phosphites and/or phosphonites disclosed in EP '628. So long as this melt-stabilizer component is present, sufficient adherent properties are not a problem for the additive composition.

Not all polymers need to be melt-stabilized, however. Indeed, with respect to particulate olefin polymers utilized in certain shaping processes, such as some injection molding processes, melt stability is a disadvantage, not an advantage.

Accordingly, a problem yet to be satisfactorily addressed in this particular art is the formulation of an essentially phosphite- and phosphonite-free additive composition for additive treatment of the olefin polymer particles, which additive composition will have adequate adherent properties, at least in the temperature range at which it is applied to the polymer particles and preferably also at room temperature.

The formulation of additive or coating compositions containing antioxidants is a vast art in itself, extending far beyond the treatment of polymer particles. The following references are considered to be illustrative of this vast art: U.S. Pat. Nos.4,289,670 (Creekmore et al.), issued Sep. 15, 1981, 4,708,979 (Pedrazzetti et al.) issued Nov. 24, 1987, 4,837,259 (Chucta), issued Jun. 6, 1989, 4,879,141 (Chatterjee), issued Nov. 7, 1989, and Canadian patent 1,267,244 (Sandrmohaghegh), issued Mar. 27, 1990.

SUMMARY OF THE INVENTION

It has now been found that certain combinations of antioxidants with a viscosity-reducing agent in certain specific ratios provide an essentially phosphite- and phosphonite-free additive composition (to which antistatic agents, slip agents, etc. can be added) with strongly adherent properties at the temperature of application to the polymer particles and also at room temperature. Depositing this additive composition on the surfaces of the olefin polymer particles results in an adherent coating which is not significantly damaged and remains substantially intact despite prolonged storage and handling.

Although the essentially phosphite- and phosphonite-free additive compositions utilized in this invention are mixtures that can contain as many as 10 or more ingredients, control over the key physical properties of the additive compositions is achieved by selecting particular ratios for only three of the ingredients. (The most important physical property to be controlled here is the tendency of the additive composition to be sticky—preferably even to the point of being almost aggressively tacky—at the temperature of application to the polymer particles, e.g. at temperatures above 45° C., but typically below about 130° C., and preferably also at room temperature.) Two of these ingredients are antioxidants, and the third is a viscosity-reducing agent or relatively low viscosity carrier material (e.g. an aliphatic oil or wax or a polymerized dimer and/or trimer acid e.g., PRIPOL 1013 or 1014).

More specifically, the three ingredients which control adherent properties are:

a. a polyhydric alcohol ester (preferably a tetrol ester) of 3-(3',5'-di-t-butyl-4'-hydroxyphenyl) propionic acid which has a melting point or melting range below about 130° C., b. a mono-ester of 3-(3',5'-di-t-butyl-4'-hydroxyphenyl) propionic acid which also has a melting point or melting range below about 130° C., and c. the viscosity-reducing agent or relatively low-viscosity carrier material, i.e. an oily liquid or low-melting wax having a viscosity, measured in Saybolt Universal Seconds or "SUS" units (ASTM D88), ranging from about 180 SUS at 100° F. (about 35 or 40 Centistokes [cSt] at about 38° C.) to about 55,000 SUS at 100° F. (roughly 12,000 cSt at 38° C.). The preferred viscosity reducing agent is an aliphatic oil or wax, e.g. an oil (which is liquid at room temperature) or an aliphatic hydrocarbon wax having a melting point low enough to be molten at temperatures well below 130° C., e.g. at about 30° to 80° C.

The preferred viscosity range for the viscosity-reducing agent is 250 to 405 SUS at 100° F. (about 50 or 55 cSt to about 85 or 90 cSt at 38° C.), more preferably at least about 280 SUS at 100° F. ($\geq$60 cSt at 38° C.).

It is convenient to express the ratios of these three ingredients in terms of parts per hundred by weight (pph), based on the weight of component "a". Expressed in this manner, the amounts of components "b" and "c" are about 20 to 35 pph (preferably 20-30 pph) and about 20 to 75 pph (preferably 25 to 65 pph), respectively.

The fully-formulated additive composition can be applied to the surfaces of the polymer particles generally in accordance with the method described in EP '628, but the resulting olefin polymer particles are coated with an additive composition which is essentially free of phosphites and phosphonites. These polymer particles are useful in a wide variety of shaping processes and the like and are particularly useful in injection molding processes.

DETAILED DESCRIPTION

As explained above, a key aspect of this invention was the discovery of a three-component composition which, by itself or in combination with antistatic agents, slip agents, and other useful additives (other than phosphites and phosphonites) would be inherently sticky at least at the temperature of application, e.g. temperatures of about 130° C. and below, particularly at temperatures in the range of about 50° to 130° C. This three-component composition, by itself or in combination with other additives, other than phosphites and phosphonites, can be deposited on the polymer particles as an almost continuous coating or at least a surface impregnation (depending on the ingredients in the composition and the porosity of the polymer particles being treated). The thus-treated polymers have good resistance to degradation (due to, for example, exposure to air) which degradation can take place during prolonged periods of storage, handling processing and end-use. These treated polymers can also exhibit good resistance to color and physical property changes caused by environmental exposure.

The amount of additive composition deposited on the polymer particles is not large—generally 0.02 to 2% by weight and preferably at least about 0.1% by weight, based on the weight of the olefin polymer.

The three-component composition which appears to provide the necessary control over adherent properties is described in detail below, subsequent to the following definitions of terms used in this application.

Definitions

The term "copolymer", as used in this application, refers to polymers derived from more than one monomer and therefore includes terpolymers, etc. The monomers used to form the "copolymer" can be polymerized at the same time (as in random co-polymers), sequentially (as in block co-polymers, heterophasic co-polymers, etc.), and in other non-random sequences or orientations.

The term "flowable", as used in this application, refers to a material which is in a liquid or molten state, either because at least one of the components of the "flowable" material is a liquid at room temperature, or because at least one of the components is in a molten state.

The Three-Component, Adherent Composition

Achieving a sufficiently adherent additive composition was difficult, since key ratios of the three components had to be determined empirically, and equipment is available which makes it possible to add the three ingredients to the polymer simultaneously or seriatim. The antioxidants and viscosity-reducing agents have markedly different effects upon cloud point (ASTM D 2500), viscosity in the liquid state, and solidification characteristics (e.g. pour point - ASTM D 97), and in some ratios the ingredients appear to be influencing these properties in opposite or inconsistent ways. Actually, opposite effects upon physical properties may be desirable, since the goal of this invention is a carefully crafted balance of physical properties.

It appears to be desirable that the three-component composition be coatable at the temperature of application to the polymer particles, but pasty and sticky at room temperature. Apparently, relatively higher amounts of mono-ester of 3-(3',5'-di-t-butyl-4'-hydroxyphenyl)propionic acid (particularly the higher aliphatic alcohol mono-esters) can have a thickening effect which provides some pastiness, while large amounts of viscosity-reducing agent such as an aliphatic oil or molten aliphatic wax can have a viscosity-reducing effect. On the other hand, there are certain specific ranges of aliphatic hydrocarbon oil content which have the greatest effect upon the pour point, and there appears to be no directly proportional relationship between pour point and oil content.

Both of the antioxidants employed in the three-component composition belong to the class of compounds known as hindered phenols. Commercially available hindered phenols typically contain one or more o,o-di-tert.-butyl phenol substituents and can be linked to a carboxylic acid residue (typically propionic acid) via the para-position of the phenolic ring, thereby providing a 3-(3',5'-di-t-butyl-4'-hydroxyphenyl)propionic acid structure, which, of course, can be esterified. When the carboxylic group of the propionic residue is esterified with a monohydric alcohol, the result is a mono-ester, but polyhydric alcohols having 2 to 6 OH groups can also be esterified with the propionic acid-bearing hindered phenol group, thereby providing two or more ester groups, preferably one ester group for each hydroxyl group of the polyhydric alcohol (i.e. full esterification).

The fully esterified polyhydric alcohol esters of 3-(3′, 5′-di-t-butyl-4′-hydroxyphenyl)propionic acid have significantly different physical properties as compared to the mono-esters. The mono-esters have been used to stabilize polyolefins for many years, due to their excellent compatibility with polymers such as polyethylene. The melting points or melting ranges of these mono-esters tend to be lower than those of the fully esterified polyhydric alcohol esters.

The preferred antioxidants used in this invention are (a) tetrol esters (tetra-esters) of 3-(3′,5′-di-butyl-4′-hydroxyphenyl)propionic acid having a melting point or melting range below about 130° C., preferably pentaerythrityl tetrakis 3-(3,5-di-t-butyl-4-hydroxyphenyl)-propanoate, also known as tetrakis [methylene (3, 5-di-tert-butyl-4-hydroxyhydrocinnamate) methane or as 2,2-bis[[3-[3,5-bis(1,1-dimethylethyl)-4-hydroxyphenyl]-1-oxopropoxy]methyl]-1,3-propanediyl 3, 5-bis(1, 1-dimethylethyl)-4-hydroxybenzenepropanoate, a white, crystalline powder which has a melting range of 110°–125° C. and is commercially available as IRGANOX 1010 (trademark of Ciba-Geigy Corporation). This hindered phenol-propionic acid/pentaerythritol tetra-ester has been approved for use in certain types of polymeric food packaging materials. (b) The mono-esters of the hindered phenol-substituted propionic acid are preferably esters of higher aliphatic alcohols (e.g. $C_{12}$–$C_{24}$-alkyl alcohols), and these mono-esters have melting points or melting ranges which are also below about 130° C., more typically below 100° C., but above about 45° C. The preferred mono-ester is octadecyl 3-(3′,5′-di-t-butyl-4′-hydroxyphenyl) propionate, also known as octadecyl 3,5-di-tert-butyl-4-hydroxyhydrocinnamate, a white, crystalline powder having a melting range of 50° to 55° C., and is commercially available as IRGANOX 1076 (trademark of Ciba-Geigy Corporation). This antioxidant has also been approved for use in certain types of polymeric food packaging materials.

The ratio of the hindered phenol/propionic acid polyol ester (component "a") to the hindered phenol/propionic acid mono-ester (component "b") is of great importance in this invention. It has been discovered that the b:a ratio cannot be as high as 0.5:1 or even as high as 0.4:1, and 0.35:1 is only marginally operative but within the broadest ambit of this invention. In the b:a=0-.4–0.5:1 range, phase separation is typically observed in the three-component composition; that is, viscosity-reducing agents (particularly the aliphatic oils) tend to phase-out to some degree. As a result, the homogeneity of the composition can be poor; the composition, though viscous, is oily rather than pasty, and the much-needed adherent properties are missing.

Homogeneity problems are also observed when the b:a ratio (i.e. the mono-ester:polyol ester ratio) is too low, e.g. 0.12:1. At 0.12:1, oiliness is also observed, due to lack of complete homogeneity. Stickiness is therefore insufficient with this composition also.

As the b:a ratio approaches 0.2:1 (e.g. 0.18:1), homogeneity improves dramatically, both in the long term and in the short term. However, the overall balance of physical properties still does not sufficiently favor stickiness or tackiness at room temperature until the b:a ratio at least equals and preferably exceeds 0.2:. This stickiness at room temperature is still observed even after a period of two months.

When the b:a ratio reaches about 0.34 or 0.35:1, homogeneity is still good, at least initially, and stickiness is initially good at room temperature, but stickiness is seen to be poor after about two months.

All of the foregoing observations are particularly valid when the amount of viscosity-reducing agent (e.g. aliphatic hydrocarbon oil) in the three-component system is fixed at 33% by weight of the total (three-component) formulation.

Having determined that the optimum b:a ratio is about 0.25:1, various levels of viscosity-reducing agent content (e.g. aliphatic hydrocarbon oil or wax), from 0% to 45% of the three-component composition, were investigated while fixing the b:a ratio at 0.25:1. By selecting these levels of the oily aliphatic viscosity-reducing agent, a series of c:a ratios was obtained, ranging from 0:1 to 1:1. At c:a=0:1, homogeneity was not affected and was excellent. At c:a=1:1, homogeneity was poor. Accordingly, selection of the optimum c:a ratio is a matter of striking a good balance between homogeneity (which may be sacrificed to a slight degree) and stickiness at room temperature, which is maximized within the c:a range of 0.25–0.75:1, the optimum c:a ratio being less than 0.65:1 but well above 0.25:1, e.g. at or near 0.5:1.

Accordingly, the preferred c:b:a ratios appear to be in the range of (1–3):(0.8–1.2):4, and the optimum ratios appear to be 2:1:4 and 2.5:1:4, although good results are also obtained with c:b:a=1:1:4.

As noted above the viscosity-reducing agent can be an oily material or a low-melting wax. Preferred oils and waxes are aliphatic, e.g. mineral oils, paraffin waxes or oils, etc. The oils can be liquid at room temperature. The waxes preferably melt at relatively low temperatures (well below 130° C.), e.g. 30° or 40° C. Suitable oils include "OB-55" (available from Raffineria Olii Lubrificanti of Milan, Italy), "Witco A-300" and "Kaydol" oils (available from Witco Corp./U.S.A.), and "Primol 355" oil (available from Exxon). These particularly suitable oils have Saybolt viscosities at 38° C. within the range of 290 to 380 SUS.

Other Ingredients of the Additive Composition

It is a goal of this invention to provide an additive composition which coats and adheres strongly to the polymer particles and remains adhered to these particles for long periods of storage and handling. Slip agents and antistatic agents can be applied at a suitable point in the process, and such agents when present, can enhance additive adhesion on the surfaces of the polymer particles. Typically they are present in significant amounts; e.g., for each such ingredient, amounts of 30 to 1000 pph, based on the weight of component "a" (the hindered phenol/propionic acid polyhydric alcohol ester) when used.

The preferred slip agents are primary, secondary, or tertiary, preferably primary or secondary amides of long-chain (e.g. $C_{12}$–$C_{24}$) aliphatic carboxylic acids having a low or modest degree of unsaturation (typically 1 to 3, preferably only one, carbon—carbon double bond), e.g oleamide or erucamide or stearyl erucamide.

The preferred antistatic agents are non-water soluble fatty acid esters, such as ATMER glycerol stearates and ATMER polyoxyethylene sorbitan monolaurate or monostearate, fatty acid amines, such as ATMER ethoxylated synthetic amines, fatty acid amides, and ATMER quaternary ammonium compounds (ATMER is a trademark of ICI).

Other useful ingredients (typically added in amounts of 20 to 1000 pph, based on the weight of component "c") include light stabilizers, acid scavengers or neutralizers, such as metal stearates; nucleating agents; etc. and mixtures thereof, but not phosphite or phosphonite compounds which could provide an undesirably high level of melt stability. Moreover, oily liquids and diluents other than paraffin oils are kept to a minimum or avoided altogether, since they may alter the delicate balance provide by the preferred c:b:a ratios. Typical light stabilizers are described in EP 0,411,628, which description is incorporated herein by reference.

The Polymer Particles

Suitable polymer particles which can be used in this invention are described in EP 0,411,628. These polymers are prepared with the aid of catalysts and processes which can produce regular shape polymer particles (e.g. spheroids) having a controlled particle size distribution. Masses of such polymer particles have high flowability and high bulk density values and a low concentration of fines. Since the polymerization process itself inherently produces the olefin polymer in this particularly desirable form, extrusion or the like plays no role in the formation of the particles. (Masses of these polymer particles, after they have been obtained, can of course be subjected to a variety of forming processes, including extrusion.)

Preferred catalysts for formation of the olefin polymer particles are of the Ziegler-Natta type and can contain, for example, titanium compounds and aluminum compounds or magnesium compounds. If stereospecific or stereoregular polymers are desired, highly active stereospecific catalysts are well known and are described extensively in the patent and scientific literature.

A preferred type of olefin polymer particle is generally symmetrical in shape and has a longest dimension of 0.5 to 4.5 mm; spherical or spheroidal particles having diameters in this range are particularly preferred. These particles exhibit a controlled particle size distribution, e.g. with at least 90% (numerically or by weight) of the particles having a diameter between 0.5 and 4.0 mm.

The polymerization which produces these particles can be carried out in liquid phase, e.g. in the presence or absence of an inert hydrocarbon solvent, or in gas phase, or even in combinations of such polymerizations. The polymerization temperature is generally between 40° and 160° C., and the process is carried out at atmospheric pressure or higher.

Thus, the polymer particles—which are already in useful sizes, size distributions, and shapes—are discharged from the polymerization reactor at moderately elevated temperatures. The surfaces of the polymer particles which later come into contact with additive compositions of this invention will be at temperatures generally within the 40°-160° C. range, typically not lower than 50° C., more typically not lower than 60° C.

A typical particle size distribution for substantially spherical olefin polymer particles is set forth below, where the symbol $\phi$ is used to represent the diameter of the particles:

$\phi > 3.5$ mm = 1 to 5%

$2 < \phi < 3.5$ mm = 45 to 55%
$1 < \phi < 2$ mm = 40 to 50%
$0.5 < \phi < 1$ mm about 2%

The monomers used to prepare these olefin polymers are essentially mono-olefins, but dienes such as butadiene, ethylidene-norbornene, and 1,4-hexadiene or the like can be co-polymerized with the mono-olefin or mono-olefins; typically, when a diene is used the amount of diene is in the range of from 1 to 10 weight-%. The mono-olefins can be straight or branched and can contain from 2 to 8 carbon atoms, the most commercially interesting monomers being ethylene (ethene), propylene (propene), 1-butene, 1-pentene, 4-methyl-1-pentene, 3-methyl-1-butene, and the like. Polymers of ethylene can be high density or low density homopolymers. Polypropylene homopolymers can be isotactic or substantially isotactic. Ethylene/propylene copolymers are contemplated, as are copolymers (including terpolymers, etc.) of polypropylene with higher alpha-olefins such as 1-butene, 1-hexene, 1-octene, and 4-methyl-1-pentene.

Copolymers can be random or non-random (e.g. heterophasic polymers obtained through sequential polymerization). Heterophasic copolymers are of particular interest in this invention, e.g. those containing 1 to 50% by weight of ethylene units.

After being treated according to this invention, the polymer particles can have pourability values from 9 to 16 seconds, measured according to ASTM norm D1895-69, method A, and bulk densities from 0.3 to 0.6 g/cm³, measured according to ASTM norm D1895-69, method A. Polymer particles having the higher pourability values are of particular importance in this invention. Polymer particles with extremely high melt flow values benefit greatly from treatments with phosphite-free and phosphonite-free additive compositions of this invention.

Method of Addition

The additive compositions of this invention are preferably deposited on the surfaces of the polymer particles shortly after discharge of the polymer particles from the polymerization reactor, separation of the polymer, and deactivation of the catalyst and purification stages. Such stages include the removal, e.g. through "flashdrying" of the excess liquid monomer or solvent that may be present in the polymerization reactor discharge (separation), and the deactivation or "killing" of the catalyst. Volatile substances, such as solvents, unreacted monomers and oligomers, if any, can be removed during the deactivation stage by treating the polymer particles with inert gases (e.g. $N_2$) at elevated temperatures (up to a few degrees below the polymer melting point) and/or steam. If steam is used, residual moisture is preferably eliminated from the polymer particles.

Upon exiting the separation and deactivation systems, the polymer particles are still fairly hot (e.g. > 50° C., more typically > 60° C. but < 160° C.), and it is preferred to deposit the flowable additive composition on the particles while they are at these moderately elevated temperatures, using known methods of surface additivation, e.g. by using continuous or discontinuous mixers (particularly horizontal mixers) optionally equipped with a spraying mechanism. Typical residence times of the polymer particles in the mixer are at least 5 minutes in order to obtain a good distribution on the surface of the particles. The ingredients of the additive composition can be introduced into the mixer from heated storage vessels in a sequence, if desired. It is especially desirable to introduce certain optional ingredients downstream from the point at which the three essential components are added, preferred examples of a downstream additives being the light stabilizers, acid scavengers or neutralizers, and particularly the slip agent or agents (e.g long-chain aliphatic carboxylic acid amides).

The principle and practice of this invention is illustrated in the following Examples.

behavior of different IRGANOX 1076/1010 ratios in paraffin oil. The five formulations and some of their properties are set forth in Table 1, below.

TABLE 1

| Ingredient | Formulations With Varying Antioxidant Ratios - (Ingredient Amounts in % By Weight) | | | | |
|---|---|---|---|---|---|
| | 1 | 2 | 3 | 4 | 5 |
| Paraffin Oil (PRIMOL 355) | 33 | 33 | 33 | 33 | 33 |
| IRGANOX 1076 | 7 | 10 | 13.5 | 17 | 22.5 |
| IRGANOX 1010 | 60 | 57 | 53.5 | 50 | 44.5 |
| IRGANOX RATIO (1076/1010) | 0.12 | 0.18 | 0.25 | 0.34 | 0.5 |
| CLOUD POINT (ASTM D 2500) | 73° C. | 64° C. | 46° C. | 37° C. | 10° C. |
| APPEARANCE AT ROOM TEMPERATURE | | | | | |
| (a) after 1 week | solid, white | waxy, thick | pasty, thick, white | pasty, waxy, thick, white | viscous, oily |
| (b) after 2 months | granular, oily, yellowish | hard, solid, brittle, slight oil spewing white | thick, slightly granular, slightly yellowish, oily, pasty | granular, brittle, waxy, solid | evident phase sep'n., oil and solid |
| HOMOGENEITY | | | | | |
| (a) after 1 week, rm. temp. | fair | excellent | excellent | good | poor |
| (b) after 2 months, rm. t. | poor | good | fair | fair | poor |
| STICKINESS | | | | | |
| (a) after 1 week, rm. tmp. | fair | fair | excellent | fair | poor |
| (b) after 2 months, rm. t. | poor | poor | fair | poor | poor |

Formulations 1 and 2 tended to form crystals faster than the other formulations and became hard, brittle, and granular after two months. Formulations 4 and 5 remained liquid and viscous, but were non-homogeneous. Crystals appear in the mixture after 1 to 2 weeks, showing a phase separation.

EXAMPLES

In these Examples, the following materials were used.
IRGANOX 1076 octadecyl 3-(3',5'-di-t-butyl-4'-hydroxy-phenyl)propionate antioxidant.
IRGANOX 1010 pentaerythrityl tetrakis 3-(3',5'-di-t-butyl-4'-hydroxyphenyl)propanoate antioxidant.
PRIMOL 355 paraffin oil reported to have a viscosity of 356 SUS at 100° C.
ERUCAMID ER erucamide slip agent.
ATMER 122 antistatic agent.

EXAMPLES 1 to 5

The ingredients listed below in Table 1A were heated to 100° to 120° C. under agitation in an $N_2$ atmosphere until a clear, homogeneous liquid was obtained. This procedure was repeated until a set of five additive formulations (formulations 1 to 5) were obtained. This set of five formulations was prepared to investigate the Thus, formulation 3 exhibited the optimum balance of properties. The melt viscosity at 100° C. is suitable for pumping, mixture homogeniety is optimum, and the formulation remains pasty and sticky for a relatively long time at room temperature.

Formulation 3 showed approximately the same homogeneity and stickiness as the phosphonite-containing stabilizing liquid mixture of Example 2 of EP 0,411,628.

The solidification characteristics at the freezing points of the formulations are summarized below.

| Formulation | Characteristics |
|---|---|
| 1 | No crystals or filaments observed. |
| 2 | Filaments observed. |
| 3 | Filaments observed. |
| 4 | Small crystals observed. |
| 5 | No crystals or filaments observed. |

EXAMPLES 6 to 10

The additive formulations of these Examples were prepared in the same manner as Examples 1 to 5, but the oil concentration was varied instead of the antioxidant (IRGANOX 1076/1010) ratio. (In all five of these Examples, the IRGANOX 1076/1010 ratio was set at or near 0.25:1, as in Example 3). The five formulations and some of their properties are set forth in Table 2A.

TABLE 2A

| | Formulations With Optimum Antioxidant Ratio But Varying Oil Concentrations | | | | |
|---|---|---|---|---|---|
| | FORMULATIONS (Ingredient Amounts in % By Weight) | | | | |
| INGREDIENT | 6 | 7 | 8 | 9 | 10 |
| Paraffin | 0 | 16 | 29 | 38 | 45 |

TABLE 2A-continued

Formulations With Optimum Antioxidant Ratio But Varying Oil Concentrations

| INGREDIENT | FORMULATIONS (Ingredient Amounts in % By Weight) | | | | |
|---|---|---|---|---|---|
| | 6 | 7 | 8 | 9 | 10 |
| Oil (PRIMOL 335) | | | | | |
| IRGANOX 1076 | 20 | 16 | 14 | 13 | 10 |
| IRGANOX 1010 | 80 | 68 | 57 | 49 | 45 |
| CLOUD POINT (ASTM D 2500) | none observed at <-10° C. | none observed at <-10° C. | 46° C. | 52° C. | 60° C. |
| APPEARANCE at room temp. after 1 wk. | hard, solid, translucent yellow, brittle | pasty, viscous, thick, translucent, yellow | 46° C. pasty, thick, white* | 52° C. pasty, slightly granular, oily | 60° C. granular oily |
| HOMOGENEITY at room temperature after 1 week | excellent | excellent | excellent** | poor | poor |
| STICKINESS at room temp. after 1 week | poor | excellent | excellent** | fair | poor |

*Pasty, thick, and slightly granular after 2 months.
**Still good after 2 months.

Formulation 8 was found to be softer than formulations 6 and 7, and more liquid-viscous than formulations 9 and 10. Formulation 8 was found to have a viscosity slightly below 100 cSt at 100° C., which means that the formulation is suitable for pumping and melt-spraying.

In a laboratory mixer, 2 kg of PRO-FAX 6501S polypropylene in spherical form having a nomimal melt flow rate of 4 dg/min (ASTM D1238-79) were heated to 65°-70° C., and enough additive formulation of Example 8 (in a flowable, i.e. molten and/or liquid state) was fed onto the hot polymer particles to provide 1000 parts per million (ppm) by weight of loading on the polymer, based on the weight of the polymer.

The spheroids treated with the formulation of Example 8 were discharged from the mixer and screened. The +18 U.S. mesh fraction (1.0-2.0 mm diameters) was retained for testing.

TABLE 2B

LOADING OF EXAMPLE 8 FORMULATION ON POLYMER

| EX. 8 INGREDIENT | ppm |
|---|---|
| Paraffin Oil (PRIMOL 335) | 500 |
| IRGANOX 1076 | 250 |
| IRGANOX 1010 | 1000 |

The spherical polymer particles surface-treated with formulation 8 were oven-aged for 5 hours, and a visual evaluation was done every hour. Samples of the surface-treated particles were also compression-molded, and the plaques were oven-aged for 7 days at 150° C. Every day, a visual evaluation was performed. The results were compared with oven-aging tests done the same way on spherical polymer particles surface treated with the phosphonite-containing formulation of Example 2 of EP 0 411 628 and on plaques molded from these surface-treated spherical particles. The spheroids treated with formulation 8 and the plaques obtained from them were found to exhibit discoloration effects and thermal stability, respectively, similar to the discoloration effects of the EP '628-treated spherical polymer particles and similar to the thermal stability of the plaques made from EP '628-treated spheroids.

EXAMPLES 11-13

The Example 8 formulation was modified by adding ERUCAMID ER slip agent and ATMER 122 antistatic agent or just Atmer 122 antistatic agent. In Examples 11 and 12, 3000 lbs. of PRO-FAX SV951 heterophasic propylene polymer in spherical particle form having an ethylene content of 3.5 wt.-% and, in Example 13, 12,000 lbs. of PTO-FAX 6101S polypropylene in spherical particle form having a nominal melt flow rate of 35 dg/min were treated with the loadings set forth in Table 3 according to the procedure of Example 8.

TABLE 3

LOADINGS OF EXAMPLE 11-13 FORMULATIONS ON POLYMER IN PARTS PER MILLION

| INGREDIENTS | EXAMPLE 11 | EXAMPLE 12 | EXAMPLE 13 |
|---|---|---|---|
| Paraffin oil (PRIMOL 355) | 500 | 500 | 500 |
| IRGANOX 1076 | 250 | 250 | 250 |
| IRGANOX 1010 | 1000 | 1000 | 1000 |
| ERUCAMID ER | 2500 | 7000 | |
| ATMER 122 | 7000 | 5000 | 6000 |

Surface-treated spherical particles (or other geometrically regular particles) of this invention are particularly well suited to injection molding and extruding processes where melt stabilization of the polymer is not necessary. Such injection molding and extrusion processes are conventional and are well known to those skilled in the art of making shaped polymeric articles. In the extrusion processes, a mass of polymeric particles is typically heated or softened or plasticized in some manner in the extruder and forced through an extrusion die to form an extrudate. In the injection molding processes, the mass of polymeric particles is typically melted and then injected into the mold, where the molten mass solidifies to form a shaped article.

What is claimed is:

1. A process for the surface treatment of a particulate olefin polymer the particles of which have a regular, substantially symmetrical geometrical shape, said particles having been formed in said geometric shape during the process in which an olefin monomer was polymerized, said process comprising depositing, on the surfaces of said particles, 0.02 to 2% by weight, based on the weight of the olefin polymer, an essentially phosphite- and phosphonite-free flowable mixture consisting essentially of:

as a first component, a polyhydric alcohol ester of 3-(3',5'-di-t-butyl-4'-hydroxyphenyl) propionic acid having a melting point or melting range below about 30° C., about 20 to 35 parts by weight, per 100 parts by weight of said first component, of a mono-ester of 3-(3',5'-di-t-butyl-4'-hydroxyphenyl)propionic acid having a melting point or melting range below about 130° C., and about 20 to 75 parts by weight, per 100 parts by weight of said first component, of a viscosity-reducing agent having a viscosity of about 180 to 55,000 Saybolt Universal Seconds at 100° F.;

said flowable mixture being sufficiently tacky to adhere to the surfaces of said particles at the temperature at which the flowable mixture is deposited on said surfaces.

2. A process according to claim 1, wherein said mono-ester of 3(3',5'-di-t-butyl-4'-hydroxyphenyl) propionic acid is the octadecyl ester, and wherein said polyhydric alcohol ester of 3-(3',5'-di-t-butyl-4'-hydroxylphenyl) propionic acid is pentaerythrityl tetrakis 3-(3,5-di-t-butyl-4-hydroxyphenyl)propanoate 3. A process according to claim 2, wherein said flowable mixture consists essentially of:

said first component;

about 20 to 30 parts by weight, per 100 parts by weight of said first component, of said mono-ester component;

about 25 to about 65 parts by weight, per 100 parts by weight of said first component, of said viscosity-reducing agent component;

about 30 to 1000 parts, per 100 parts by weight of said first component, of an antistatic agent, about 30 to 1000 parts, per 100 parts by weight of said first component, of a slip agent, and about 20 to 1000 parts each, per 100 parts by weight of said first component, of a light stabilizer, a thioether, an organic polysulfide, an acid scavenger or neutralizer, a nucleating agent, or a mixture thereof.

4. A process according to claim 3, wherein said slip agent comprises erucamide, oleamide, stearyl erucamide, or mixtures thereof.

5. A process according to claim 2, wherein said flowable mixture is at a temperature in the range of about 45 to about 130° C., and said particles are at a temperature above 40° C. but less than about 120° C.

6. A process according to claim 2, wherein said particles are substantially spherical.

7. A process according to claim 3, wherein said particles have diameters ranging from 0.5 to 4.5 mm, at least 90% having a diameter between 0.5 and 4.0 mm.

8. A process according to claim 2, wherein said olefin polymer comprises at least one homo- or co-polymer of propylene, ethylene, butene, pentene, hexene, octene, 4-methyl-1-pentene, or 3-methyl-1-butene, optionally combined through random co-polymerization or sequential co-polymerization with a diene.

9. A process according to claim 2, wherein said polymer particles have a bulk density of about 0.3 to 0.6 g/cm$^3$, determined according to ASTM norm 1895-69 method A, and a pourability value of about 9 to 16 seconds, measured according to ASTM norm 1895-69 method A.

10. A process for the surface treatment of substantially spherical olefin polymer particles having a diameter in the range of about 0.5 to 4.5 mm, said particles having been obtained directly from the polymerization reactor in which an olefin polymer was polymerized, said process comprising:

depositing, on the surface of said particles, 0.02 to 2% by weight, based on the weight of the olefin polymer, of an essentially phosphite- and phosphonite-free, tackifier-free flowable mixture which is tacky, at least within the temperature range 40° to 130° C., said mixture consisting essentially of:

pentaerythrityl tetrakis 3-(3',5'-di-t-butyl-4'-hydroxyphenyl) propanoate, about 20 to 30 parts by weight, per 100 parts by weight of said propanoate, of octadecyl 3-(3',5'-di-t-butyl-4'-hydroxyphenyl) propionate, 25 to 65 parts by weight, per 100 parts by weight of said propanoate, of an aliphatic oil or wax which is liquid at a temperature within the range of room temperature to 130° C., up to 1000 parts by weight, per 100 parts by weight of said propanoate, of an antistatic agent, and up to 1000 parts by weight, per 100 parts by weight of said propanoate, of oleamide, erucamide, stearyl erucamide, or a mixture thereof, and recovering the resulting olefin polymer particles treated with an adherent coating of said flowable mixture.

11. Surface-treated olefin polymer particles made by the process of claim 2.

12. An injection molding process in which polymer particles are melted and injected, with an injection device, into a mold, said polymer particles being the surface-treated olefin polymer particles of claim 11.

13. An extrusion process in which a polymeric mass comprising polymer particles is formed into an extrudate with an extruder, said polymer particles being the surface-treated olefin polymer particles of claim 11.

* * * * *

UNITED STATES PATENT AND TRADEMARK OFFICE
CERTIFICATE OF CORRECTION

PATENT NO. : 5,238,635

DATED : August 24, 1993

INVENTOR(S) : Bryan J. Launchbury et al

It is certified that error appears in the above-identified patent and that said Letters Patent is hereby corrected as shown below:

On the title page, Item [54] Title of the Invention:
In the Title, change "PROCESS FOR TREATMENT OF PARTICULATE OLEFIN POLYMER, RESULTING TREATED PARTICLES AND METHOD FOR USING TREATING PARTICLES" to --PROCESS FOR TREATMENT OF PARTICULATE OLEFIN POLYMER, RESULTING TREATED PARTICLES AND METHOD FOR USING TREATED PARTICLES--.

At col. 1, line 5, change "TREATING" to --TREATED--.

At col. 5, line 68, change "0.2:." to --0.2:1.--.

At col. 8, line 4, change "0.5 < $\phi$ < 1 mm about 2%" to --0.5 < $\phi$ < 1 mm = about 2%--.

Signed and Sealed this

Twenty-ninth Day of March, 1994

Attest:

BRUCE LEHMAN

*Attesting Officer*  *Commissioner of Patents and Trademarks*